(12) United States Patent
Lim

(10) Patent No.: US 11,314,182 B2
(45) Date of Patent: Apr. 26, 2022

(54) COMPENSATION FOR SCANNING LINE CURVATURE BY USING IMAGING LENS

(71) Applicant: HEWLETT-PACKARD DEVELOPMENT COMPANY, L.P., Spring, TX (US)

(72) Inventor: Heon-Hee Lim, Suwon-si (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/273,266

(22) PCT Filed: Sep. 6, 2019

(86) PCT No.: PCT/US2019/049991
§ 371 (c)(1),
(2) Date: Mar. 3, 2021

(87) PCT Pub. No.: WO2020/051482
PCT Pub. Date: Mar. 12, 2020

(65) Prior Publication Data
US 2021/0318635 A1  Oct. 14, 2021

(30) Foreign Application Priority Data
Sep. 7, 2018 (KR) .......................... 10-2018-0107201

(51) Int. Cl.
G03G 15/04 (2006.01)
G02B 26/12 (2006.01)
G03G 15/043 (2006.01)

(52) U.S. Cl.
CPC ......... *G03G 15/0409* (2013.01); *G02B 26/12* (2013.01); *G03G 15/043* (2013.01)

(58) Field of Classification Search
CPC ......... G03G 15/04036; G03G 15/0409; G03G 15/043; G02B 26/00; G02B 26/08; G02B 26/10; G02B 26/12; G02B 26/125; B41J 2/00; B41J 2/435; B41J 2/447
See application file for complete search history.

(56) References Cited

U.S. PATENT DOCUMENTS

| | | | |
|---|---|---|---|
| 2007/0211325 A1 | 9/2007 | Ichii | |
| 2008/0084594 A1 | 4/2008 | Masuda | |
| 2010/0165434 A1* | 7/2010 | Lim | G02B 26/125 359/204.1 |
| 2011/0228343 A1 | 9/2011 | Isogawa et al. | |

(Continued)

FOREIGN PATENT DOCUMENTS

| | | |
|---|---|---|
| EP | 3287831 A1 | 2/2018 |
| JP | 20090258577 | 11/2009 |

(Continued)

*Primary Examiner* — Sophia S Chen
(74) *Attorney, Agent, or Firm* — Staas & Halsey LLP

(57) ABSTRACT

An optical scanning device includes an optical source portion to emit an optical beam; an optical deflector to deflect the optical beam in a main scanning direction; and an imaging lens to image the deflected optical beam onto a light-exposed object. A scanning line curvature caused by a refractive index deviation of the imaging lens is determined, and a curvature of the imaging lens in a sub-scanning direction is determined based on the determined scanning line curvature.

15 Claims, 10 Drawing Sheets

(56) References Cited

U.S. PATENT DOCUMENTS

| | | | | |
|---|---|---|---|---|
| 2011/0242634 A1* | 10/2011 | Fujino | ............... | G02B 26/125 |
| | | | | 359/207.6 |
| 2013/0014380 A1* | 1/2013 | Tanimura | ............... | B41J 2/473 |
| | | | | 29/592.1 |
| 2013/0222506 A1* | 8/2013 | Yoshida | ........... | G03G 15/04036 |
| | | | | 347/118 |
| 2014/0139602 A1* | 5/2014 | Suzuki | ............... | G02B 26/127 |
| | | | | 347/118 |
| 2015/0338641 A1 | 11/2015 | Yokoyama | | |
| 2020/0057299 A1* | 2/2020 | Teramura | ........... | G03G 15/0409 |

FOREIGN PATENT DOCUMENTS

| | | |
|---|---|---|
| JP | 20130012891 | 1/2013 |
| JP | 20130029753 | 2/2013 |

* cited by examiner

COMPENSATION FOR SCANNING LINE CURVATURE BY USING IMAGING LENS

CROSS REFERENCE TO RELATED APPLICATIONS

This application is filed under 35 U.S.C. 0.371 as a National Stage of PCT International Application No. PCT/US2019/049991, filed on Sep. 6, 2019, in the U.S. Patent and Trademark Office, which claims the priority benefit of Korean Patent Application No. 10-2018-0107201 filed on Sep. 7, 2018, in the Korean Patent Office. The disclosures of PCT International Application No. PCT/US2019/049991 and Korean Patent Application No. 10-2018-0107201 are incorporated by reference herein in their entireties.

BACKGROUND

An electrophotographic printer develops an electrostatic latent image formed in a photoconductor as a visible toner image, and after transferring the toner image to a recording medium, fuses the toner image to print the toner image. The electrophotographic printer implements an optical scanning device configured to deflect light in a main scanning direction, wherein the light is modulated in correspondence with image information, and to irradiate the deflected light onto the photoconductor moving in a sub-scanning direction.

The optical scanning device includes optical devices, such as a collimating lens, a cylindrical lens, an f-theta (θ) lens (an imaging lens), etc., in order to form an image from light irradiated from a light source in the form of a spot in the photoconductor. In a process of manufacturing an imaging lens, a refractive index of the imaging lens may not be constant in a sub-scanning direction and a main scanning direction, and thus, a scanning line formed on a photoconductor may not be in parallel with the main scanning direction and may be curved, which is referred to as scanning line curvature.

DETAILED DESCRIPTION

An electrophotographic printer may include at least one photoconductor, an optical scanning device configured to form an electrostatic latent image by irradiating an optical beam onto the photoconductor, a developing device configured to form a visible toner image by supplying a developer to the electrostatic latent image, a transfer unit configured to transfer the toner image to a print medium, and a fuser configured to fuse the toner image to the print medium. The optical scanning device may implement an imaging lens having a curvature in a sub-scanning direction, the curvature being designed to correct a scanning line curvature described with reference to FIGS. 2 through 13. Hereinafter, examples of the optical scanning device and the electrophotographic printer implementing the optical scanning device will be described.

Figure 1:
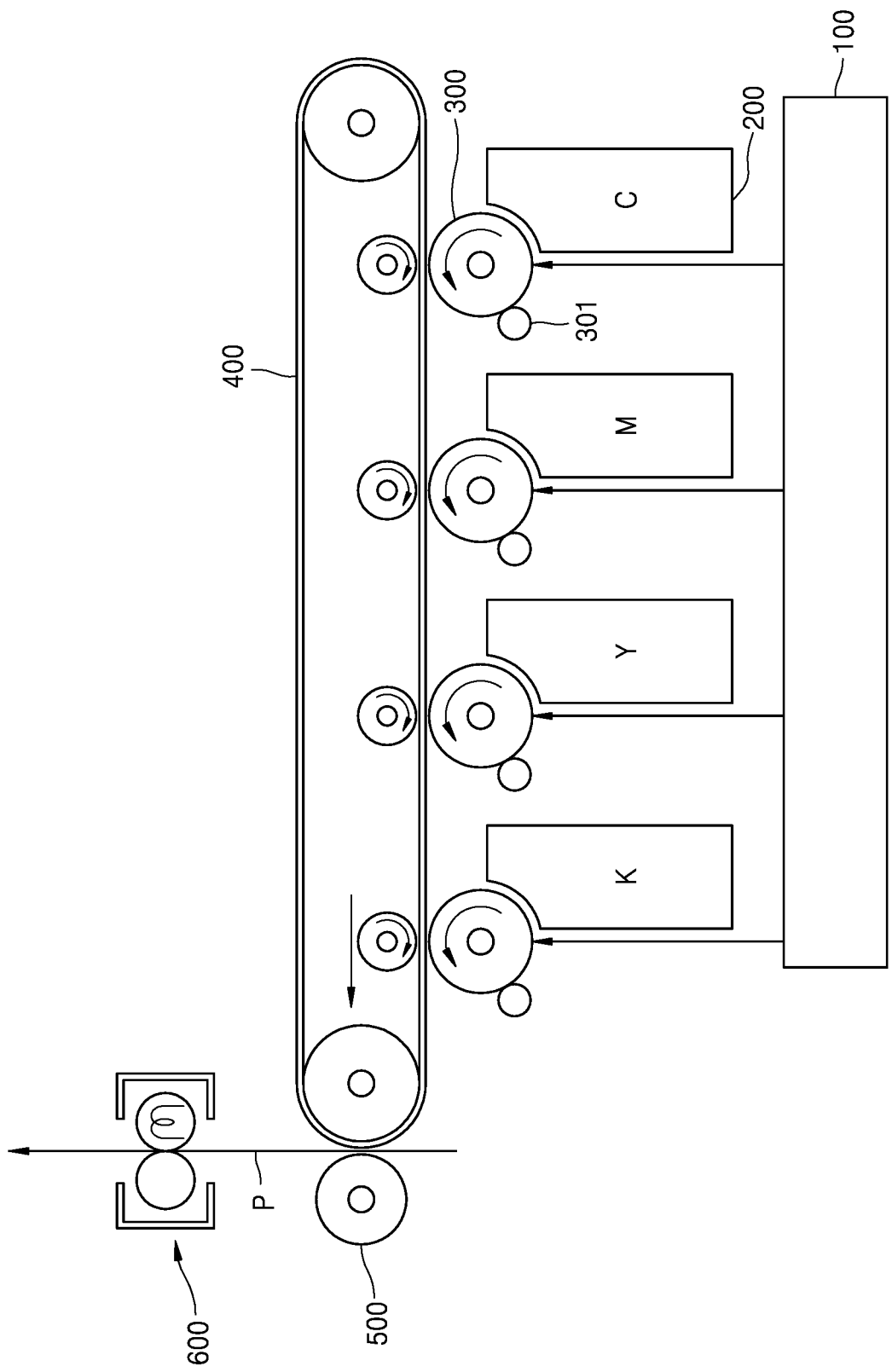
FIG. 1 is a schematic structural diagram of an electrophotographic printer, according to an example.

FIG. 1 is a schematic structural view of an electrophotographic printer, according to an example. FIG. 1 illustrates a photosensitive drum 300, a charging roller 301, an optical scanning device 100, a developing device 200, an intermediate transfer belt 400, a transfer roller 500, and a fuser 600.

The photosensitive drum 300 is an example of a photoconductor, and may be a photosensitive layer having a certain thickness that is formed on an outer circumferential surface of a cylindrical metal pipe. The photoconductor may include a photosensitive belt that has the form of a belt. The charging roller 301 may rotate by contacting the photosensitive drum 300. The charging roller 301 may be an example of a charger that charges a surface of the photosensitive drum 300 to have a uniform electric potential. A charge bias voltage may be applied to the charging roller 301. A corona charger (not shown) may be used, rather than the charging roller 301. The optical scanning device 100 may form an electrostatic latent image by irradiating an optical beam, which is modulated in correspondence to image information, onto the photosensitive drum 300, as a light-exposed object, charged to have the uniform electric potential.

A toner may be accommodated in the developing device 200. The toner may be moved to the photosensitive drum 300 via a developing bias voltage applied between the developing device 200 and the photosensitive drum 300, to develop the electrostatic latent image into a visible toner image. The toner image formed in the photosensitive drum 300 may be transferred to the intermediate transfer belt 400. The toner image may be transferred to a print medium P transferred between the transfer roller 500 and the intermediate transfer belt 400, via a transfer bias applied to the transfer roller 500. The toner image transferred to the print medium P may be fused to the print medium P by receiving heat and pressure from the fuser 600, and the image formation is completed.

To print a color image, electrostatic latent images corresponding to image information of a black (K) color, a magenta (M) color, a yellow (Y) color, and a cyan (C) color may be formed in four photosensitive drums 300K, 300M, 300Y, and 300C, respectively. Four developing devices 200K, 200M, 200Y, and 200C may provide toners of the black (K) color, the magenta (M) color, the yellow (Y) color, and the cyan (C) color to the photosensitive drums 300K, 300M, 300Y, and 300C, respectively, to form toner images of the black (K) color, the magenta (M) color, the yellow (Y) color, and the cyan (C) color. The toner images of the black (K) color, the magenta (M) color, the yellow (Y) color, and the cyan (C) color may be transferred to the intermediate transfer belt 400 in an overlapping manner and may be transferred to the print medium P.

The optical scanning device 100 may include an optical source portion configured to emit an optical beam, an optical deflector configured to deflect and scan the optical beam in a main scanning direction (Y), and an imaging lens configured to image the deflected optical beam on a light-exposed object by scanning the deflected optical beam in a constant scanning speed. The optical scanning device 100 used in the electrophotographic printer for printing a color image may scan four optical beams corresponding to the black (K) color, the magenta (M) color, the yellow (Y) color, and the cyan (C) color, and to this end, may include four optical deflectors. A tandem-type optical scanning device may implement a single optical deflector or double optical deflectors, in order to reduce a size of the device and the number of components of the device, wherein the optical beams may be obliquely incident to the optical deflectors in a sub-scanning direction (X). The optical scanning device 100 according to the present example is the tandem-type optical scanning device implementing a single optical deflector.

Figure 2:
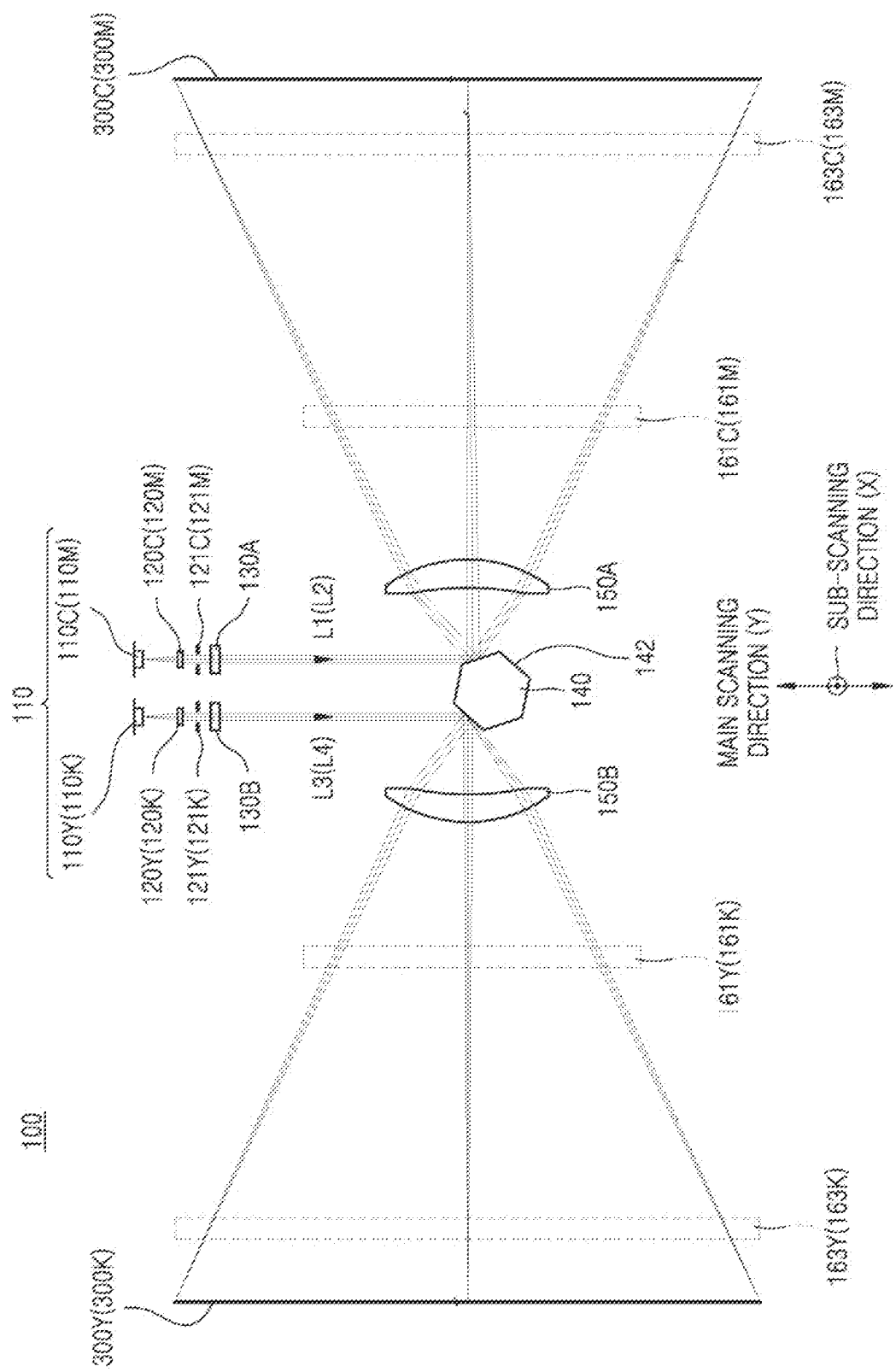
FIG. 2 illustrates a main scanning plane of an optical scanning device, according to an example.
Figure 3:
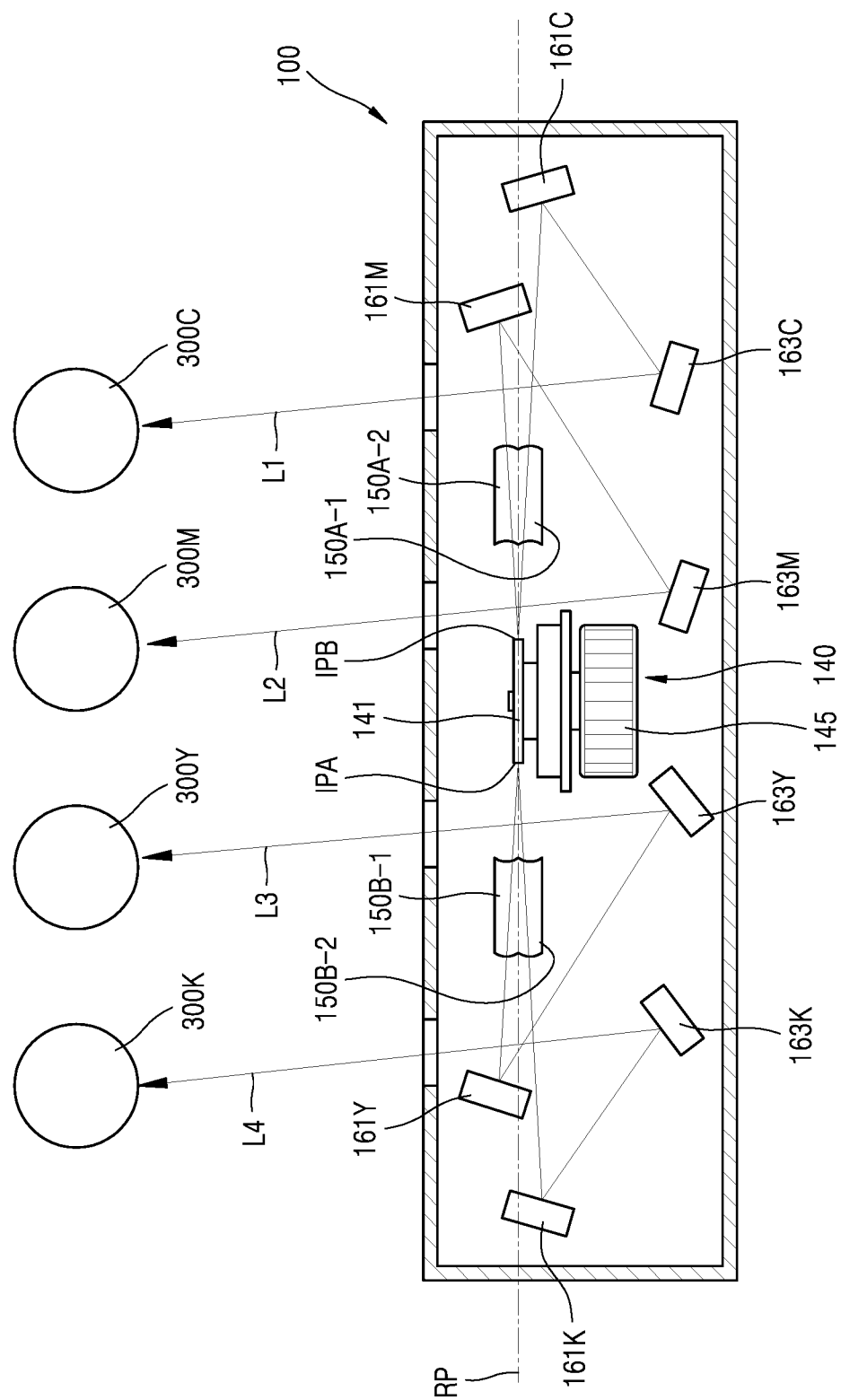
FIG. 3 illustrates a sub-scanning plane of the optical scanning device illustrated in FIG. 2, according to an example.

FIG. 2 illustrates a main scanning plane of the optical scanning device 100, according to an example. FIG. 3 illustrates a sub-scanning plane of the optical scanning device 100 of FIG. 2, according to an example. For convenience, FIG. 2 does not illustrate optical paths that are modulated by reflection members 161C, 161M, 161Y, 161K, 163C, 163M, 163Y, and 163K, and illustrates one of optical components, when the optical components are overlapped when optical beams L1, L2, L3, and L4 are obliquely incident to the optical deflector 140 in the sub-scanning direction.

Referring to FIGS. 2 and 3, the optical scanning device 100 according to the present example may be configured to scan the plurality of optical beams L1, L2, L3, and L4 in the main scanning direction, and may include the optical source portion 110 configured to emit the first through fourth optical beams L1, L2, L3, and L4, the optical deflector 140, and the imaging lens configured to image the first through fourth optical beams L1, L2, L3, and L4 on the photosensitive drums 300C, 300M, 300Y, and 300K, respectively.

For example, the optical source portion 110 may include first through fourth optical sources 110C, 110M, 110Y, and 110K. The first through fourth optical sources 110C, 110M, 110Y, and 110K may emit the first through fourth optical beams L1, L2, L3, and L4 corresponding to the photosensitive drums 300C, 300M, 300Y, and 300K, respectively. The first and second optical sources 110C and 110M may form a pair and may be arranged in parallel in a vertical direction. The third and fourth optical sources 110Y and 110K may form a pair and may be arranged in parallel in a vertical direction. The first and second optical sources 110C and 110M and the third and fourth optical sources 110Y and 110K may be arranged to face each other with respect to the optical deflector 140. The number and the arrangement of the optical sources are not limited thereto and may be variously modified. The first through fourth optical sources 110C, 110M, 110Y, and 110K may be arranged on a single circuit board. The first through fourth optical sources 110C, 110M, 110Y, and 110K may include laser diodes irradiating the first through fourth optical beams L1, L2, L3, and L4, respectively.

The optical deflector 140 may include a rotational polygon mirror 141 having a plurality of deflection surfaces 142, that is, reflection surfaces, and a motor 145 configured to rotate the rotational polygon mirror 141. The optical deflector 140 may deflect the first through fourth optical beams L1, L2, L3, and L4 that are incident when the rotational polygon mirror 141 rotates, in the main scanning direction. FIG. 2 illustrates that the optical deflector 140 has six deflection surfaces 142. However, the number of deflection surfaces of the optical deflector 140 is not limited thereto.

Each of the first through fourth optical beams L1, L2, L3, and L4 may be obliquely incident to the optical deflector 140 in the sub-scanning direction, with respect to a reference plane RP. The reference plane RP may be, for example, a plane intersecting a rotation axis of the optical deflector 140 at right angles and including incident points at which the first through fourth optical beams L1, L2, L3, and L4 are incident to the deflection surfaces 142. For example, the first and second optical beams L1 and L2 may be incident to the same incident point IPA, and may be symmetric with each other in the sub-scanning direction with respect to the reference plane RP. Also, the third and fourth optical beams L3 and L4 may be incident to the same incident point IPB, and may be symmetric with each other in the sub-scanning direction with respect to the reference plane RP. The reference plane RP may include both of the incident point IPA and the incident point IPB. Although not illustrated in the drawings, two reference planes each including the incident points IPA and IPB and intersecting the rotation axis of the optical deflector 140 at right angles may be defined. It is illustrated in the drawings that the reference plane RP extends in a lateral direction. However, in reality, the reference plane RP may be reflected by first reflection members 161C, 161M, 161Y, and 161K, and second reflection members 163C, 163M, 163Y, and 163K, to be described below, and may extend along a progression path of the first through fourth optical beams L1 through L4.

Collimating lenses 120C and 120M shaping the first and second optical beams L1 and L2 into parallel beams, and a cylindrical lens 130A focusing the first and second optical beams L1 and L2 to the deflection surfaces 142 of the optical deflector 140 may be provided between the first and second optical sources 110C and 110M and the optical deflector 140. The cylindrical lens 130A may be commonly used for the first and second optical beams L1 and L2. Also in the left counterpart, collimating lenses 120Y and 120K shaping the third and fourth optical beams L3 and L4 into parallel beams, and a cylindrical lens 130B focusing the third and fourth optical beams L3 and L4 to the deflection surfaces 142 of the optical deflector 140 may be provided between the third and fourth optical sources 110Y and 110K and the optical deflector 140. In addition, apertures 121C, 121M, 121Y, and 121K may be arranged between the collimating lenses 120C, 120M, 120Y, and 120K, and the cylindrical lenses 130A and 130B, to adjust diameters of the first through fourth optical beams L1 through L4.

The imaging lens may image the first through fourth optical beams L1 through L4 deflected by the optical deflector 140 on outer circumferential surfaces, that is, scanned surfaces, of the photosensitive drums 300C, 300M, 300Y, and 300K, respectively. An optical axis of the imaging lens may be parallel to the reference plane RP. The optical axis of the imaging lens may be on the reference plane RP. The imaging lens may include first and second imaging lenses 150A and 150B. The first imaging lens 150A may image the first and second optical beams L1 and L2 on the outer circumferential surfaces of the photosensitive drums 300C and 300M, respectively. The second imaging lens 150B may image the third and fourth optical beams L3 and L4 on the outer circumferential surfaces of the photosensitive drums 300Y and 300K, respectively. The first and second imaging lenses 150A and 150B may be arranged at both sides of the optical deflector 140 to face each other. The first and second imaging lenses 150A and 150B may be f-θ lenses configured to image the first through fourth optical beams L1 through L4 deflected by the optical deflector 140 on the photosensitive drums 300C, 300M, 300Y, and 300K in a constant scanning speed. An optical design of the first and second imaging lenses 150A and 150B may vary according to distances between the optical deflector 140 and the photosensitive drums 300C, 300M, 300Y, and 300K, locations of the first and second imaging lenses 150A and 150б, etc.

The first imaging lens 150A may include a first imaging portion 150A-1 corresponding to the first optical beam L1 and a second imaging portion 150A-2 corresponding to the second optical beam L2. The first imaging lens 150A may be an integrated-type lens in which the first imaging portion 150A-1 and the second imaging portion 150A-2 are located to be symmetric with each other in the sub-scanning direction with respect to the reference plane RP. Likewise, the second imaging lens 150б may include a third imaging portion 150B-1 corresponding to the third optical beam L3 and a fourth imaging portion 150B-2 corresponding to the fourth optical beam L4. The second imaging lens 150б may be an integrated-type lens in which the third imaging portion 150B-1 and the fourth imaging portion 150B-2 are located to be symmetric with each other in the sub-scanning direction with respect to the reference plane RP.

The first reflection members 161C, 161M, 161Y, and 161K, and the second reflection members 163C, 163M, 163Y, and 163K may be members configured to change paths of the first through fourth optical beams L1 through L4, as illustrated in FIG. 3. As the first reflection members 161C, 161M, 161Y, and 161K, and the second reflection members 163C, 163M, 163Y, and 163K, reflection mirrors or total reflection prisms may be adopted. For example, the first reflection members 161C, 161M, 161Y, and 161K, and the second reflection members 163C, 163M, 163Y, and 163K may have a bar-shaped rectangular shape. The first reflection members 161C, 161M, 161Y, and 161K, and the second reflection members 163C, 163M, 163Y, and 163K may change the paths of the first through fourth optical beams L1 through L4, by adjusting inclination angles thereof or shapes of reflection surfaces thereof. The first reflection members 161C, 161M, 161Y, and 161K, and the second reflection members 163C, 163M, 163Y, and 163K may change the paths of the first through fourth optical beams L1 through L4 such that the first through fourth optical beams L1 through L4 may become toward the photosensitive drums 300C, 300M, 300Y, and 300K, after passing through the first and second imaging lenses 150A and 150B.

The imaging lens may be formed based on injection molding. For example, a transparent material may be melted, inserted into a metal mold, molded, and then, cooled. Thereafter, the molded imaging lens may be withdrawn from the metal mold. Based on this manufacturing method, refractive index deviation may occur in the imaging lens. In other words, a cooling speed of the melted material may vary based on a thickness thereof in the main scanning direction and the sub-scanning direction. The difference in the cooling speed may cause a difference in density. The refractive index depends on the density of a material, and thus, the refractive index deviation depending on a location in the main scanning direction and the sub-scanning direction occurs in the imaging lens.

Figure 4:
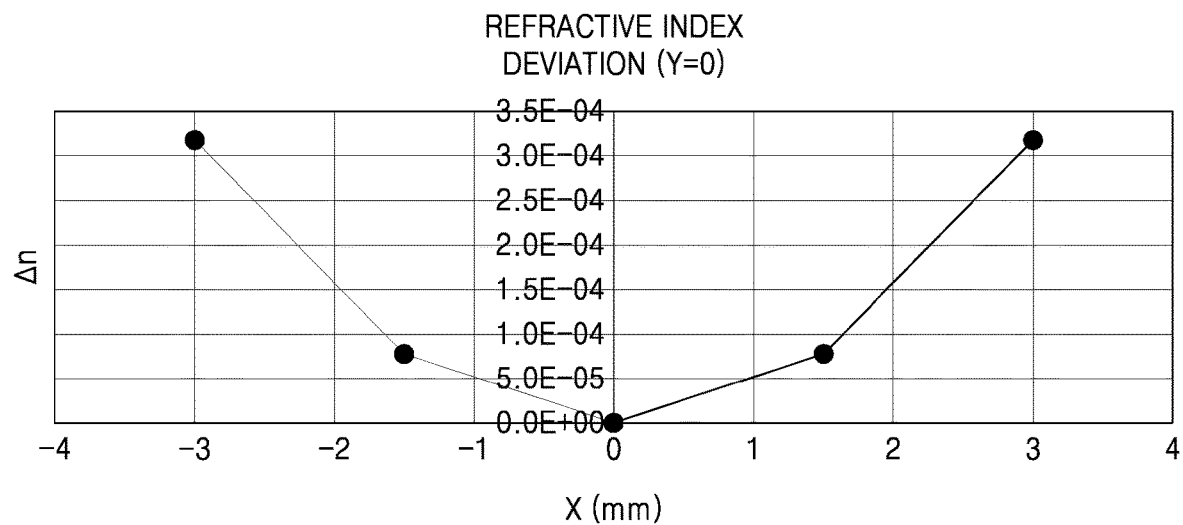
FIG. 4 is an example of refractive index deviation of an imaging lens in a sub-scanning direction.
Figure 5:
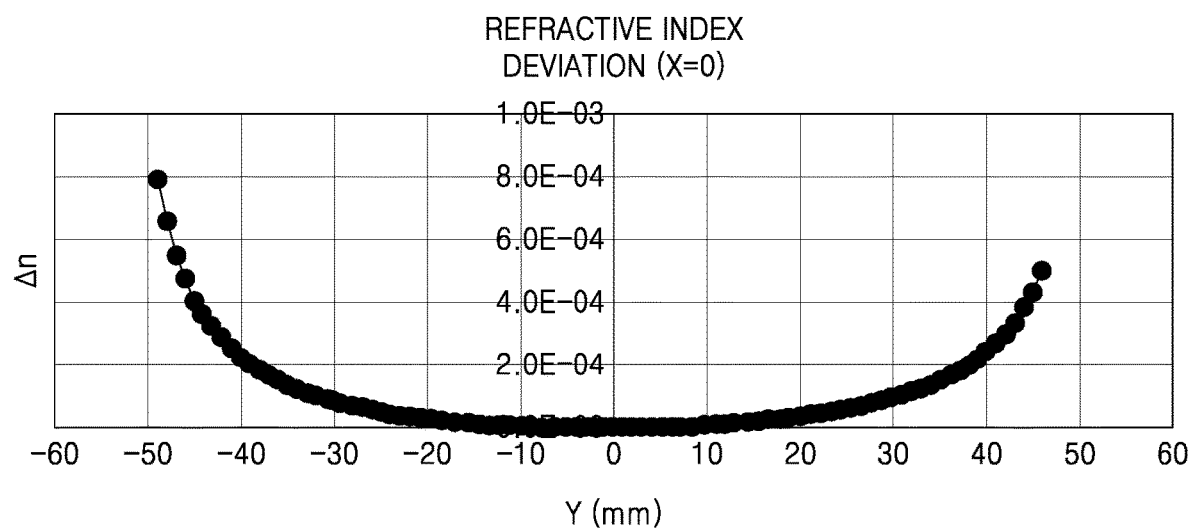
FIG. 5 is an example of refractive index deviation of an imaging lens in a main scanning direction.

FIG. 4 illustrates an example of refractive index deviation of an imaging lens in a sub-scanning direction and FIG. 5 illustrates an example of refractive index deviation of the imaging lens in a main scanning direction. Referring to FIGS. 4 and 5, the refractive index deviation increases away from an optical axis of the imaging lens in the sub-scanning direction and the main scanning direction. Based on the assumption that a refractive index is constant, a curvature of the imaging lens in the sub-scanning direction is designed lest a scanning line curvature is generated. Accordingly, when there is a refractive index deviation in the imaging lens according to a location thereof, the scanning line curvature occurs.

Figure 6:
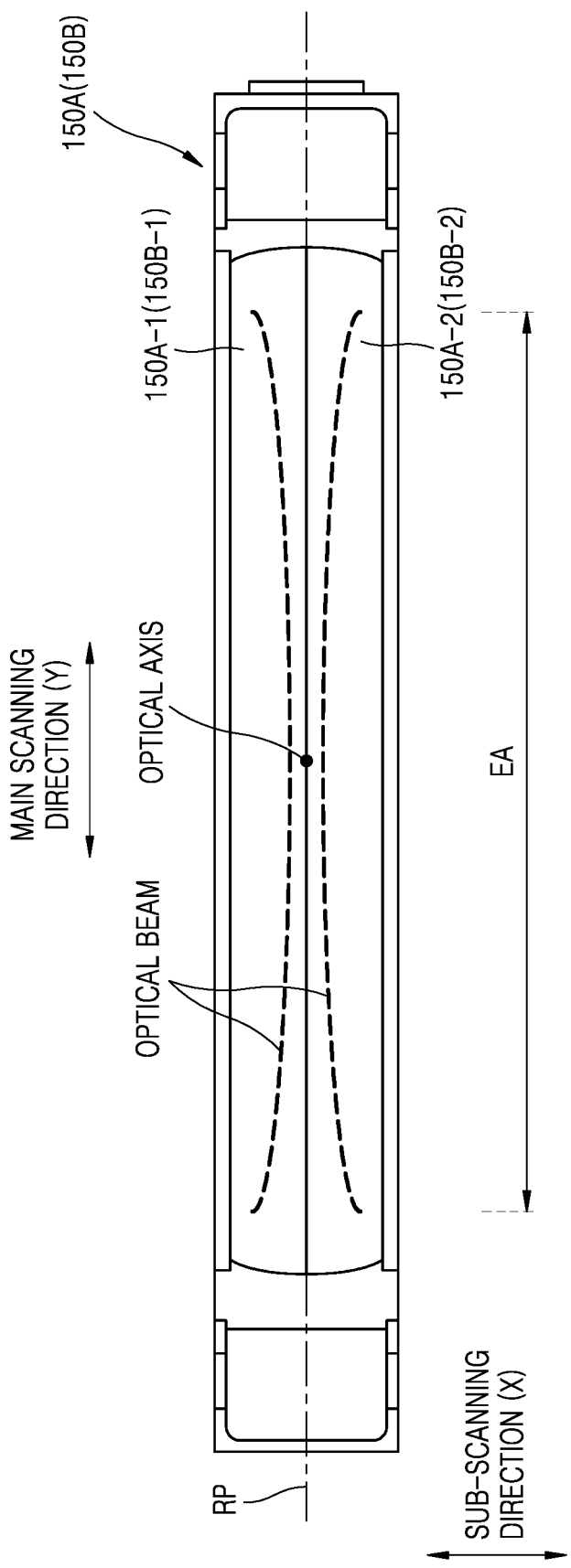
FIG. 6 is a view illustrating a location of an optical beam in an imaging lens when the optical beam passes through the imaging lens in an oblique optical system.

As described above, in the optical scanning device 100 implementing the oblique optical system, the optical beams are obliquely incident to the imaging lens with respect to the reference plane RP. FIG. 6 is a diagram illustrating a location of an optical beam in an imaging lens when the optical beam passes through the imaging lens in an oblique optical system. Referring to FIG. 6, when the optical beam is incident on the imaging lens, the farther the optical beam is away from an optical axis of the imaging lens, the larger a refractive index of a portion of the imaging lens through which the optical beam passes is, and thus, an imaging point of the optical beam on a light-exposed object may be deviated in a sub-scanning direction and the degree of deviation of the imaging point may vary based on a location of the imaging point in a main scanning direction. This is referred to as scanning line curvature.

Figure 7:
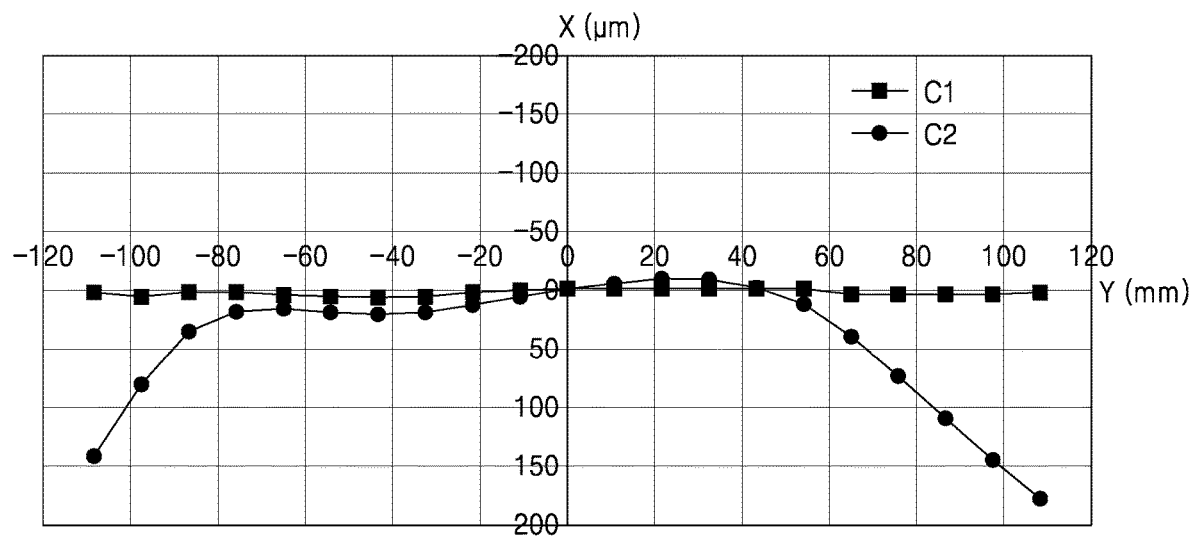
FIG. 7 is a graph illustrating an example of scanning line curvature due to refractive index deviation.

FIG. 7 is a graph illustrating an example of scanning line curvature due to refractive index deviation. C1 illustrates the scanning line curvature in a case in which there is no refractive index deviation, that is, the case in which all locations of an imaging lens have a uniform refractive index. C2 illustrates the scanning line curvature (a first scanning line curvature) in a case in which there are the refractive index deviations illustrated in FIGS. 4 and 5, according to a location of the imaging lens.

[Simulation Conditions]

The number of the deflection surfaces (142): 4

An angle of view at the deflection surface (142): ±44°

An angle in which an optical beam is incident to the deflection surface (142) with respect to the reference plane RP: 3°

A material of the imaging lens: a cyclic olefin copolymer (COC)-based resin

With respect to C1 of FIG. 7, when there is no refractive index deviation, it is possible to design an imaging lens (hereinafter, an ideal imaging lens) having an ideal curvature in a sub-scanning direction such that there is little scanning line curvature. When the ideal imaging lens is manufactured based on injection molding, the scanning line curvature (the first scanning line curvature), illustrated as C2, occurs due to the refractive index deviations illustrated in FIGS. 4 and 5. With respect to C2 of FIG. 7, the maximum value of the scanning line curvature is equal to or higher than 180 μm and a deviation of a value equal to or higher than 4 dots occurs based on the resolution of 600 dots per inch (dpi). In the case of color printing, an alignment error of a value equal to or higher than 8 dots may occur between color pixels.

As a thickness of the imaging lens in the sub-scanning direction and the main scanning direction decreases, the refractive index deviation decreases, and the scanning line curvature also decreases. To this end, for example, the first imaging portion 150A-1 and the second imaging portion 150A-2 included in the first imaging lens 150A may be formed as separate lenses and may be located to be symmetric with each other in the sub-scanning direction with respect to the reference plane RP. Likewise, the third imaging portion 150B-1 and the fourth imaging portion 150B-2 included in the second imaging lens 150B maybe formed as separate lenses and may be located to be symmetric with each other in the sub-scanning direction with respect to the reference plane RP. However, in this case, with the increased number of lenses, component costs and assembling process costs may be increased. As another solution, it may be considered to apply sufficient cooling time when forming the imaging lens by using the injection molding method. However, in this case, the productivity may be deteriorated, which may consequently cause an increase in the component costs.

The optical scanning device 100 according to the present example may correct, by using the curvature of the imaging lens in the sub-scanning direction, the scanning line curvature due to the refractive index deviation generated in the process of manufacturing the imaging lens. To this end, the curvature of the imaging lens in the sub-scanning direction may be determined to compensate for the scanning line curvature due to the refractive index deviation of the imaging lens. That is, when the refractive index is constant, the curvature of the imaging lens in the sub-scanning direction may be determined to have the second scanning line curvature which is in a direction opposite to a direction in which the first scanning line curvature (C2 of FIG. 7) is bent, the first scanning line curvature being generated due to the refractive index deviation of the imaging lens.

Figure 8:
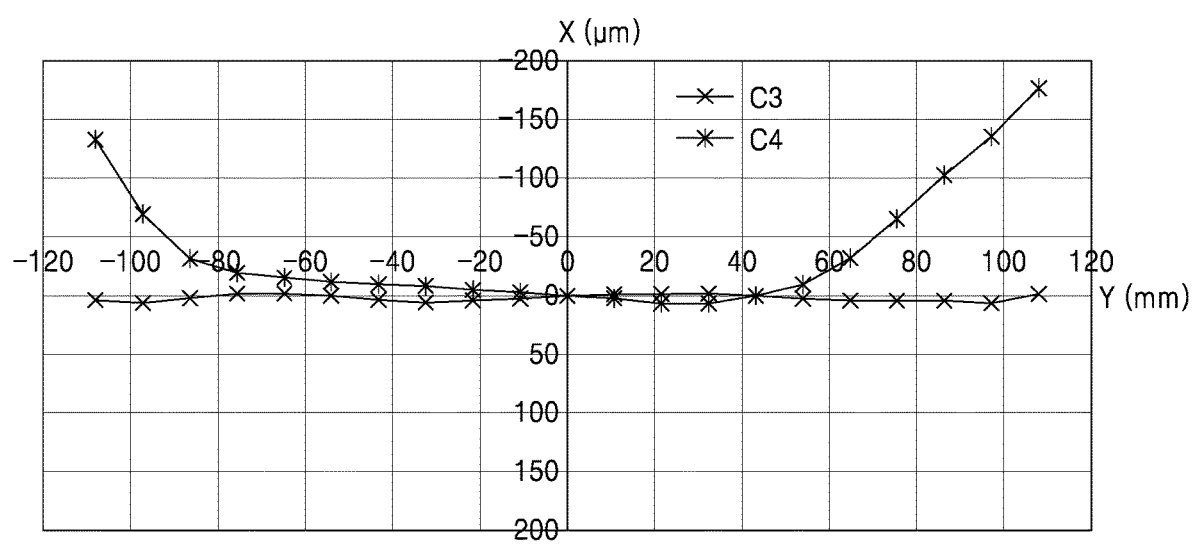
FIG. 8 is a graph illustrating an example of second scanning line curvature.

FIG. 8 is a graph illustrating an example of the second scanning line curvature. C3 illustrates the second scanning line curvature generated when a compensating imaging lens has no refractive index deviation, that is, when the compensating imaging lens has a uniform refractive index, wherein the compensating imaging lens is designed to have a curvature in the sub-scanning direction to compensate for the first scanning line curvature due to the refractive index deviations illustrated in FIGS. 4 and 5. C4 illustrates scanning line curvature corrected by the compensating imaging lens.

For example, the refractive index deviation may be obtained by forming the ideal imaging lens based on injection molding and measuring the refractive indices in the sub-scanning direction and the main scanning direction. As another example, the refractive index deviation may be obtained by performing simulation by using a shape of the ideal imaging lens, a type of a material, a condition of injection molding, etc. The first scanning line curvature may be calculated by using the measured or simulated refractive index deviation, and the curvature of the imaging lens in the sub-scanning direction may be determined to compensate for the first scanning line curvature. As illustrated in FIG. 8, the curvature of the imaging lens in the sub-scanning direction may be designed to compensate for the first scanning line curvature, so that the scanning line curvature may be compensated for without increasing the number of components. According to the electrophotographic printer implementing the optical scanning device 100, degradation of the image quality due to the scanning line curvature may be prevented.

Figure 9:
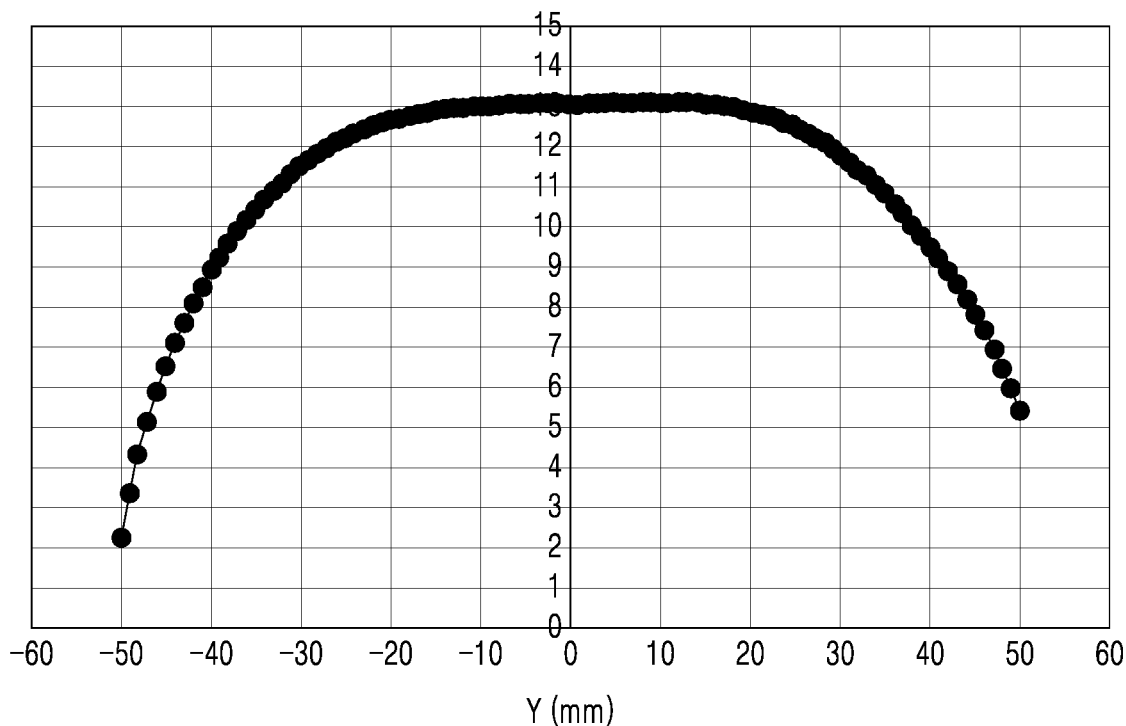
FIG. 9 is a graph illustrating an example of a thickness of an imaging lens in an optical axis direction.

FIG. 9 is a graph illustrating an example of a thickness of an imaging lens in an optical axis direction. As illustrated in FIG. 9, the thickness of the imaging lens in the optical axis direction may decrease away from an optical axis, generally in at least a half (½) area of an effective area EA (refer to FIG. 6) of the imaging lens in the main scanning direction. Thus, the curvature of the imaging lens in the sub-scanning direction may be determined such that, when the refractive index of the imaging lens is constant, the scanning line curvature (the second scanning line curvature) increases away from the optical axis of the imaging lens toward the main scanning direction. Also, a graph illustrating a difference in optical power of the imaging lens in the sub-scanning direction before and after the scanning line curvature due to the refractive index deviation is corrected, in other words, the difference in optical power in the sub-scanning direction between the compensating imaging lens and the ideal imaging lens may have a shape, in which the graph is upwardly convex in at least a half (½) area of the effective area EA of the imaging lens, based on the optical axis. Also, the difference in optical power in at least a half (½) area of the effective area EA of the imaging lens based on the optical axis is a positive number.

The optical power of the imaging lens in the sub-scanning direction is determined based on the curvature of the imaging lens in the sub-scanning direction. The optical power ϕ may be calculated as the formula below.

$$\emptyset = (n-1)\left(\frac{1}{R_1} - \frac{1}{R_2} + \frac{t}{n} \cdot \frac{(n-1)}{R_1 \cdot R_2}\right)$$

Here,
ϕ is an optical power,
N is a refractive index of a material of the imaging lens,
$R_1$ is a radius of curvature of an incident surface of the imaging lens,
$R_2$ is a radius of curvature of an exit surface of the imaging lens, and
t is a thickness of the imaging lens in the optical axis direction.

Figure 10:
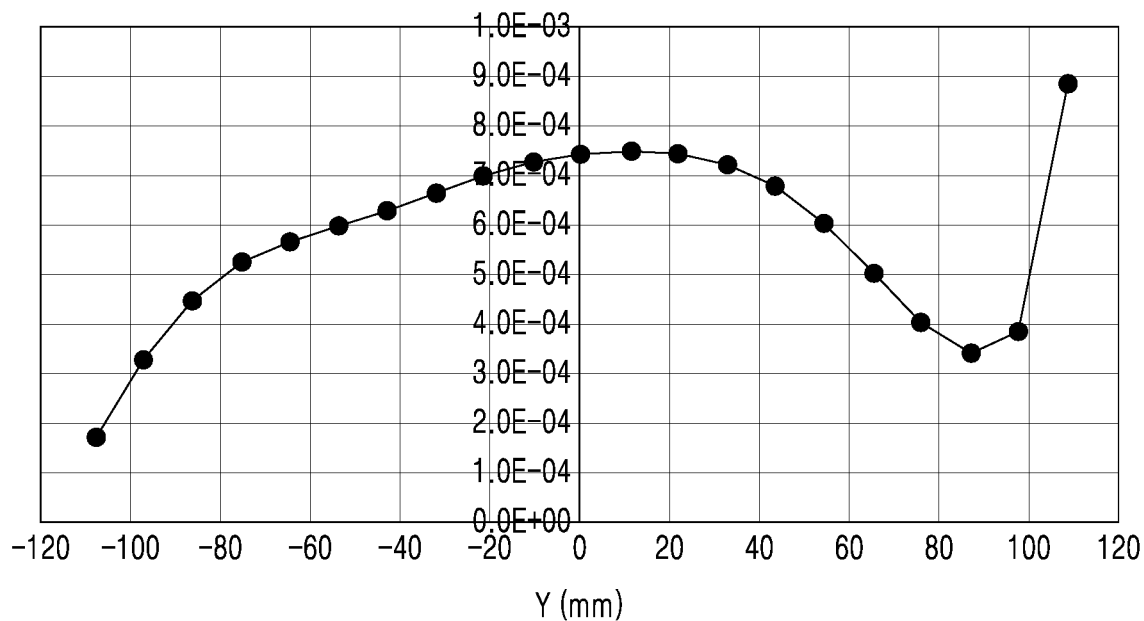
FIG. 10 is a graph illustrating a difference between optical power of a compensating imaging lens and optical power of an ideal imaging lens, when a refractive index is constant at n.

FIG. 10 is a graph illustrating a difference in optical power between the compensating imaging lens and the ideal imaging lens, when the refractive index is constant at n. As described above, the thickness of the imaging lens in the optical axis direction may decrease away from the optical axis, generally in at least a half (½) area of the effective area EA of the imaging lens in the main scanning direction. Thus, the graph illustrating the difference in optical power between the compensating imaging lens and the ideal imaging lens has a shape, in which the graph is upwardly convex in at least a half (½) area of the effective area EA of the imaging lens in the main scanning direction, as illustrated in FIG. 10. In the optical scanning device 100 according to the present example, areas approximately between −120 mm to +120 mm based on the optical axis corresponds to the effective area EA of the imaging lens and as illustrated in FIG. 10, the graph illustrating the difference in optical power in areas between −80 mm and +80 mm based on the optical axis has a upwardly convex shape. Also, it is shown in FIG. 10 that the difference in optical power is generally a positive number. The reason that the graph illustrating the difference in optical power is not symmetric based on the optical axis is because a gate for injecting a melted transparent material into a metal mold is located at a side in the main scanning direction. In the graph illustrated in FIG. 10, the gate is located at a right side based on the optical axis.

Figure 11:
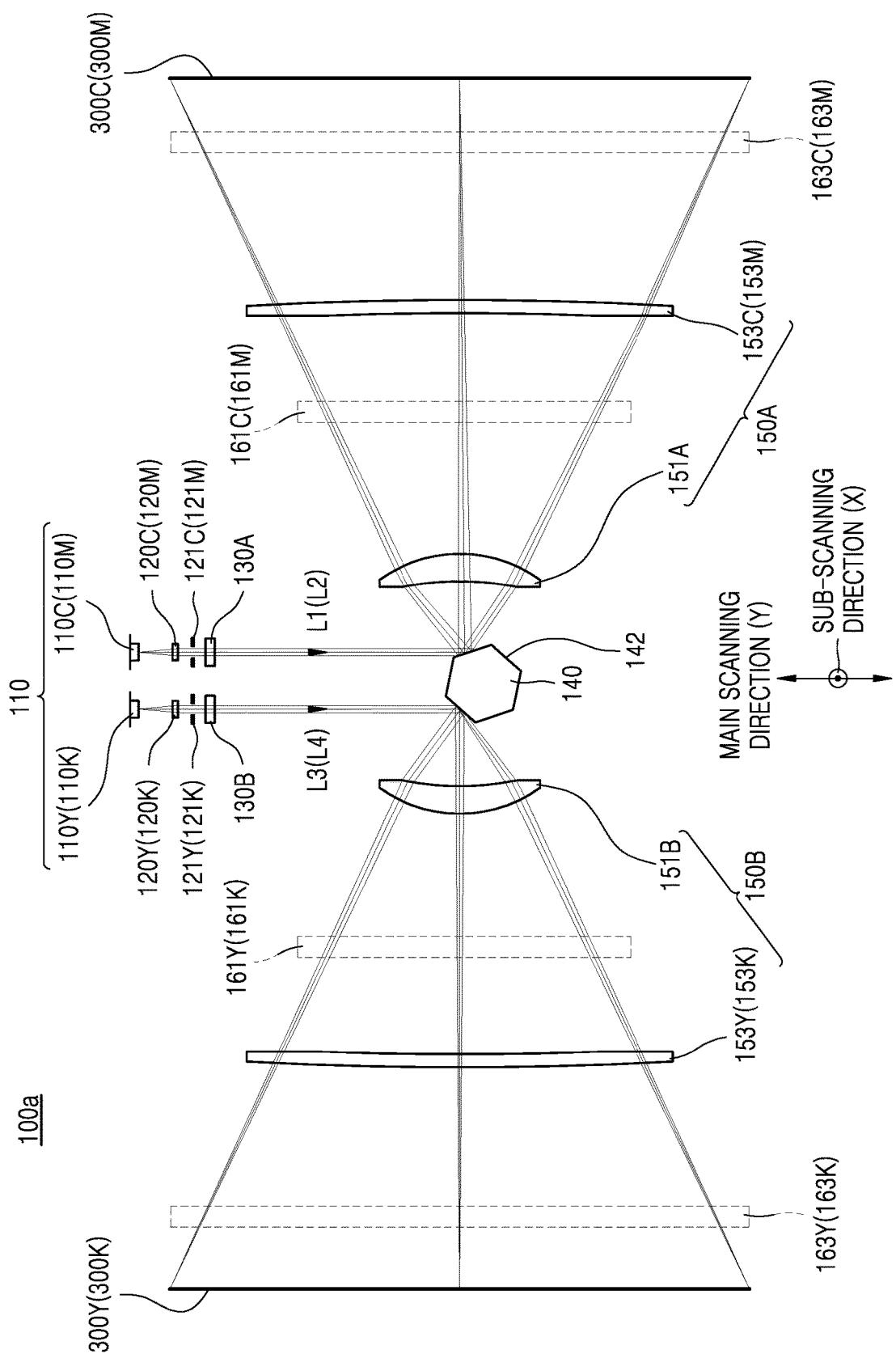
FIG. 11 illustrates a main scanning plane of an optical scanning device, according to an example.
Figure 12:
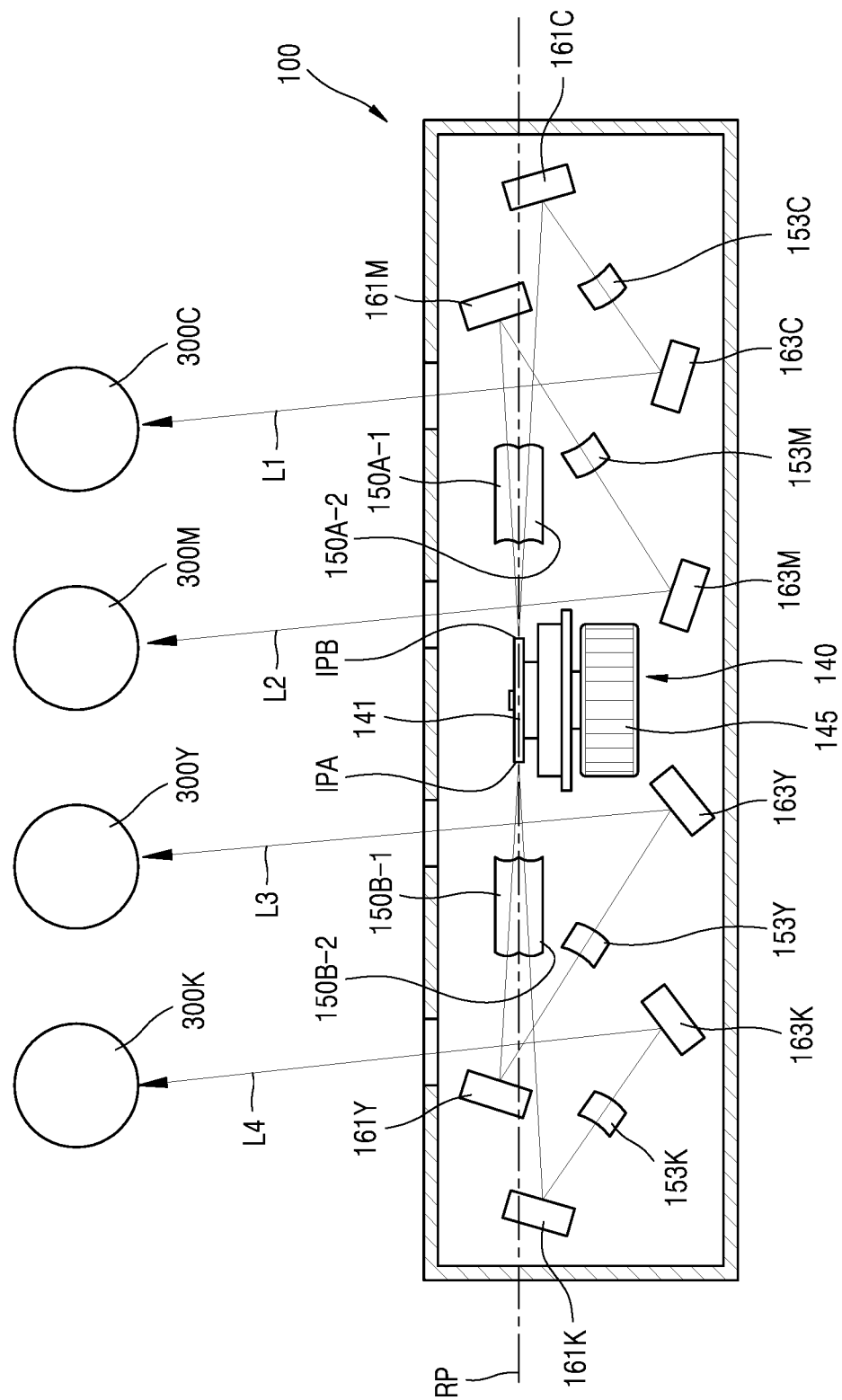
FIG. 12 illustrates a sub-scanning plane of the optical scanning device illustrated in FIG. 11, according to an example.

FIG. 11 illustrates a main scanning plane of an optical scanning device 100a, according to an example. FIG. 12 illustrates a sub-scanning plane of the optical scanning device 100a of FIG. 11, according to an example. For convenience, FIG. 11 does not illustrate optical paths that are modulated by the reflection members 161C, 161M, 161Y, 161K, 163C, 163M, 163Y, and 163K, and illustrates one of optical components, when the optical components are overlapped when optical beams L1, L2, L3, and L4 are obliquely incident to the optical deflector 140 in the sub-scanning direction.

The optical scanning device 100a illustrated in FIGS. 11 and 12 according to the present example may differ from the optical scanning device 100 illustrated in FIGS. 2 and 3 in that an imaging lens may include first and second lenses arranged in a direction in which the optical beams progress. That is, in FIGS. 11 and 12, the first imaging lens 150A illustrated in FIGS. 2 and 3 is divided into a first lens 151A through which the first and second optical beams L1 and L2 pass, and a pair of second lenses 153C and 153M arranged to be apart from the first lens 151A in a direction in which the first and second optical beams L1 and L2 progress, and through which the first and second optical beams L1 and L2 pass, respectively. In FIGS. 11 and 12, the second imaging lens 150B illustrated in FIGS. 2 and 3 is divided into a third lens 151B through which the third and fourth optical beams L3 and L4 pass, and a pair of fourth lenses 153Y and 153K arranged to be apart from the third lens 151B in a direction in which the third and fourth optical beams L3 and L4 progress, and through which the third and fourth optical beams L3 and L4 pass, respectively.

The first lens 151A may include a first imaging portion 151A-1 corresponding to the first optical beam L1 and a second imaging portion 151A-2 corresponding to the second optical beam L2. The first lens 151A may be an integrated-type lens in which the first imaging portion 151A-1 and the second imaging portion 151A-2 are located to be symmetric with each other in the sub-scanning direction with respect to the reference plane RP. The third lens 151B may include a third imaging portion 151B-1 corresponding to the third optical beam L3 and a fourth imaging portion 151B-2 corresponding to the fourth optical beam L4. The third lens 151B may be an integrated-type lens in which the third imaging portion 151B-1 and the fourth imaging portion 151B-2 are located to be symmetric with each other in the sub-scanning direction with respect to the reference plane RP.

In the optical scanning device 100a illustrated in FIGS. 11 and 12, at least one of the first lens 151A, the pair of second lenses 153C and 153M, the third lens 151B, and the pair of fourth lenses 153Y and 153K may be the compensating imaging lens described above. For example, the first lens 151A and the third lens 151B may be the described compensating imaging lens. The pair of second lenses 153C and 153M and the pair of fourth lenses 153Y and 153K may be the described compensating imaging lens. Also, all of the first lens 151A, the pair of second lenses 153C and 153M, the third lens 151B, and the pair of fourth lenses 153Y and 153K may be the described compensating imaging lens.

In the example described above, the case in which the optical beam is oblique with respect to the optical axis of the imaging lens is described. However, the optical beam may be in parallel with the optical axis of the imaging lens. For example, in the example illustrated in FIGS. 11 and 12, the first through fourth optical beams L1, L2, L3, and L4 may be in parallel with the optical axis of the pair of second lenses 153C and 153M and the pair of fourth lenses 153Y and 153K. Also, in an optical scanning device implemented in a monochromatic printer, an optical beam may be incident to an imaging lens in parallel with an optical axis of the imaging lens.

Figure 13:
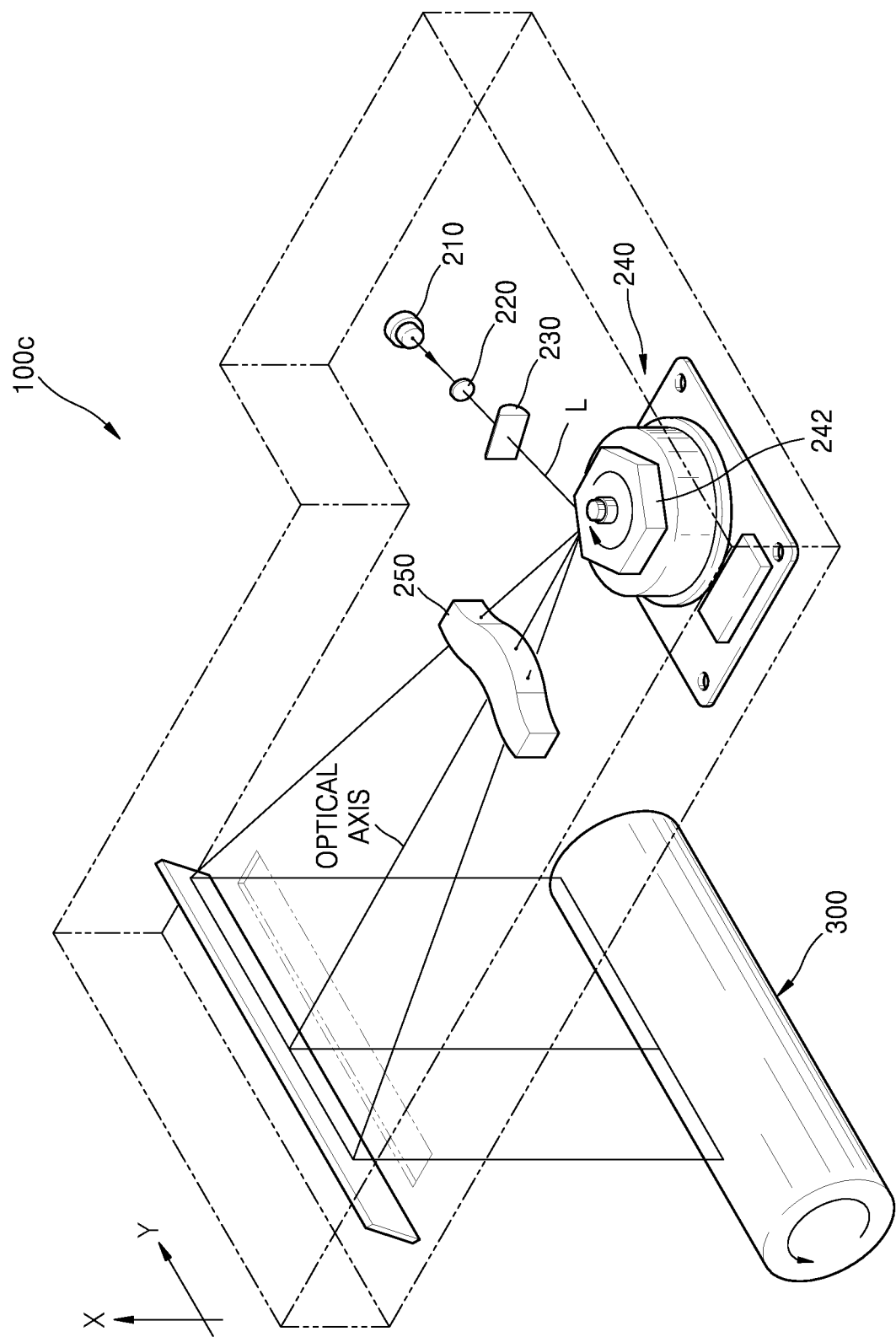
FIG. 13 is a schematic perspective view of an optical scanning device according to an example.

FIG. 13 is a schematic perspective view of an optical scanning device 100c according to an example. Referring to FIG. 13, the optical scanning device 100c may include an optical source portion 210 configured to irradiate an optical beam L and an optical deflector 240 configured to deflect and scan, in a main scanning direction, the optical beam L irradiated from the optical source portion 210 on a light-exposed object, for example, the photosensitive drum 300. The optical beam L may be perpendicularly incident to a deflection surface 242 of the optical deflector 240. A collimating lens 220 configured to make the optical beam L as a parallel beam may be provided on an optical path between the optical source portion 210 and the optical deflector 240. A cylindrical lens 230 configured to focus the optical beam L in the sub-scanning direction and image the optical beam L on the deflection surface 242 may be provided between the collimating lens 220 and the optical deflector 240.

The optical beam L may be incident to an imaging lens 250 in parallel with an optical axis thereof. The imaging lens 250 may image the optical beam L deflected by the optical deflector 240 on a surface of the light-exposed object in a constant scanning speed. The imaging lens 250 may include, for example, an f-theta (θ) lens. The imaging lens 250 may be the compensating imaging lens described above.

While examples have been described with reference to the figures, it will be understood by those of ordinary skill in the art that various changes in form and details may be made therein without departing from the spirit and scope as defined by the following claims.

What is claimed is:

1. An optical scanning device comprising:
an optical source to emit an optical beam;
an optical deflector to deflect the optical beam in a main scanning direction; and
an imaging lens to image the deflected optical beam onto a light-exposed object,
wherein a curvature of the imaging lens in a sub-scanning direction is determined based on a determined curvature of a scanning line caused by a refractive index deviation of the imaging lens.

2. The optical scanning device of claim 1, wherein the curvature of the imaging lens in the sub-scanning direction is determined so when a refractive index of the imaging lens is constant, the scanning line curvature increases as the scanning line moves away from an optical axis of the imaging lens toward the main scanning direction.

3. The optical scanning device of claim 1, wherein, when a refractive index of the imaging lens is constant, a difference in optical power of the imaging lens in the subscanning direction before and after the scanning line curvature caused by the refractive index deviation is compensated for has a graphical shape in which at least a half area of an effective area of the imaging lens with respect to an optical axis of the imaging lens is upwardly convex.

4. The optical scanning device of claim 3, wherein the difference in optical power is a positive number.

5. The optical scanning device of claim 1, wherein the optical beam is obliquely incident to an optical deflection surface of the optical deflector with respect to a reference plane perpendicular to an axis of the optical deflector.

6. The optical scanning device of claim 5, wherein the optical beam comprises:
a first optical beam symmetric with a second optical beam in the sub-scanning direction with respect to the reference plane; and a third optical beam symmetric with a fourth optical beam in the sub-scanning direction with respect to the reference plane, wherein the third optical beam and the fourth optical beam face the first and second optical beams with respect to the optical deflector.

7. The optical scanning device of claim 6, wherein the imaging lens comprises:

a first imaging lens comprising a first imaging portion and a second imaging portion, wherein the first and second imaging portions respectively correspond to the first optical beam and the second optical beam; and a second imaging lens comprising a third imaging portion and a fourth imaging portion, wherein the third and fourth imaging portions respectively correspond to the third optical beam and the fourth optical beam.

8. The optical scanning device of claim 7, wherein the first imaging lens and the second imaging lens face each other with respect to the optical deflector.

9. The optical scanning device of claim 6, wherein the imaging lens comprises:

a first imaging lens comprising
a first lens comprising a first imaging portion and second imaging portion, and
a pair of second lenses located apart from the first lens in a direction in which the first and second optical beams progress and through which the first and second optical beams pass, respectively; and a second imaging lens comprising
a third lens comprising a third imaging portion and a fourth imaging portion, and
a pair of fourth lenses located apart from the third lens in a direction in which the third and fourth optical beams progress and through which the third and fourth optical beams pass, respectively.

10. The optical scanning device of claim 1, wherein the optical beam is parallel to an optical axis of the imaging lens.

11. An electrophotographic printer comprising:

at least one photoconductor;

the optical scanning device of claim 1, wherein the optical scanning device is to form an electrostatic latent image by irradiating an optical beam onto the photoconductor;

a developing device to supply a developer to the electrostatic latent image and form a visible toner image; and a fuser to fuse the toner image that was transferred to a print medium.

12. An optical scanning device of an electrophotographic printer, the optical scanning device comprising:

an optical source to emit a first optical beam and a second optical beam that are symmetrically oblique with respect to a reference plane in a sub-scanning direction;

an optical deflector to deflect the first optical beam and the second optical beam in a main scanning direction; and an imaging lens to image the deflected first and second optical beams onto a light-exposed object, wherein
a first scanning line curvature is generated due to a refractive index deviation of the imaging lens, and
a curvature of the imaging lens in the sub-scanning direction is determined so when a refractive index of the imaging lens is constant, the imaging lens generates a curvature for a second scanning line that is bent in a direction opposite to a direction in which the first scanning line curvature is bent.

13. The optical scanning device of claim 12, wherein the curvature of the imaging lens in the sub-scanning direction is determined so when the refractive index of the imaging lens is constant, the second scanning line curvature increases as the second scanning line moves away from an optical axis of the imaging lens toward the main scanning direction, and wherein the imaging lens is formed based on injection molding.

14. The optical scanning device of claim 13, wherein, when the refractive index of the imaging lens is constant, a difference in optical power of the imaging lens in the sub-scanning direction before and after the first scanning line curvature due to the refractive index deviation is compensated for has a graphical shape in which at least a half area of an effective area of the imaging lens with respect to the optical axis of the imaging lens is upwardly convex.

15. The optical scanning device of claim 14, wherein the difference in optical power is a positive number.

* * * * *